(12) United States Patent
Suzuki (10) Patent No.: US 7,706,684 B2
(45) Date of Patent: Apr. 27, 2010

(54) IMAGE-CAPTURE APPARATUS (75) Inventor: Katsuhiro Suzuki, Kanagawa (JP)

(73) Assignee: Sony Corporation, Tokyo (JP)

( * ) Notice: Subject to any disclaimer, the term of this patent is extended or adjusted under 35 U.S.C. 154(b) by 244 days.

(21) Appl. No.: 11/973,410

(22) Filed: Oct. 9, 2007

(65) Prior Publication Data

US 2008/0089678 A1 Apr. 17, 2008

(30) Foreign Application Priority Data

Oct. 11, 2006 (JP) ............................ P2006-277842

(51) Int. Cl.
G03B 17/02 (2006.01)
H04N 5/225 (2006.01)
(52) U.S. Cl. ....................................... 396/535; 348/373
(58) Field of Classification Search .................. 396/535; 348/373
See application file for complete search history.

(56) References Cited

U.S. PATENT DOCUMENTS

2005/0099521 A1 * 5/2005 Bleau et al. .................. 348/340

FOREIGN PATENT DOCUMENTS

| JP | 2003 249780 | | 9/2003 |
|---|---|---|---|
| JP | 2003-249782 | * | 9/2003 |
| JP | 2006-85002 | | 3/2006 |
| JP | 2006-172651 | | 6/2006 |

* cited by examiner

Primary Examiner—Rodney E Fuller
(74) Attorney, Agent, or Firm—Frommer Lawrence & Haug LLP; William S. Frommer; Thomas F. Presson (57) ABSTRACT

An image-capture apparatus includes: an outer casing inside of which predetermined sections are arranged; an imaging device arranged inside of the outer casing; and a circuit board arranged inside of the outer casing, on which electronic components are mounted, the electronic components being heat generating elements. A heat-releasing air duct is formed on an outer surface side of the outer casing, at least an opening of the duct being formed at one surface of the outer casing and not communicating with an inside of the outer casing. Part of the outer casing is provided as a duct forming part that forms the heat-releasing air duct. Heat generated by the electronic components mounted on the circuit board is conducted to the duct forming part to be released outside of the outer casing from the heat-releasing air duct.

13 Claims, 10 Drawing Sheets

IMAGE-CAPTURE APPARATUS

BACKGROUND OF THE INVENTION

1. Field of the Invention

The present invention relates to a technical field of image-capture apparatuses, and particularly to a technical field in which a heat-releasing air duct that does not communicated with an inner side of an outer casing is formed on an outer surface side of the outer casing, thereby improving heat radiation efficiency and the like while ensuring downsizing.

2. Description of Related Art

In an image-capture apparatus such as a video camera, a circuit board and an imaging device are arranged in the inner side of an outer casing. On the circuit board, electronic components, which will be heat generating elements, are mounted. The imaging device converts an image of a subject into a video signal.

Since a typical image-capture apparatus has low heat resistance, it is necessary to suppress a rise of internal temperature in the outer casing due to heat generated by the electronic components.

In related art, as a structure that suppresses the rise in internal temperature, heat generating elements and other parts are isolated by providing a partition plate inside of an outer casing, and the heat generated by heat generating elements is conducted to the outer casing formed of metal or the like so as to be released outside (e.g., refer to Japanese Patent Application Publication No. JP2003-249780).

Moreover, there is a related art image-capture apparatus, in which a cooling fan is arranged inside of an outer casing, cooling air is taken in from an intake hole formed in the outer casing, and the heat is released outside from an exhaust hole formed in the outer casing by the cooling fan.

SUMMARY OF THE INVENTION

However, in the structure disclosed in Japanese Patent Application Publication No. JP2003-249780, the heat is conducted to the entire part of the outer casing so as to be released outside. As a result, for example, in an apparatus such as an image-capture apparatus which a user grips by the outer casing to use or take a photograph, there is an issue that the heat is transferred to the user's hand and makes the user uncomfortable, thereby ruining usability. Accordingly, in order to improve the usability, it is preferable to take a measure such as reducing an amount of the heat conducted to the outer casing, or improve heat radiation efficiency by increasing the outer casing in its size.

Moreover, as in the above-described related art image-capture apparatus, if the intake hole and the exhaust hole are formed in the outer casing, there is a possibility that dust and the like enters the inside of the outer casing through the intake hole or the exhaust hole, thereby causing malfunction.

Thus, it is desirable for image-capture apparatuses to improve heat radiation efficiency and the like while ensuring downsizing. The present invention is made in view of the above issues.

In an embodiment of present invention, there is provided an image-capture apparatus including an outer casing inside of which predetermined sections are arranged; an imaging device arranged inside of the outer casing; and a circuit board arranged inside of the outer casing, on which electronic components are mounted, the electronic components being heat generating elements. Furthermore, a heat-releasing air duct is formed on an outer surface side of the outer casing, at least an opening of the duct being formed at one surface of the outer casing and not communicating with an inside of the outer casing. Furthermore, part of the outer casing is provided as a duct forming part that forms the heat-releasing air duct. Furthermore, heat generated by the electronic components mounted on the circuit board is conducted to the duct forming part to be released outside of the outer casing from the heat-releasing air duct.

Accordingly, in the image-capture apparatus of the present embodiment, the heat generated by the electronic components, which will be heat generating elements, is released outside of the outer casing from the heat-releasing air duct through the duct forming part.

More specifically, according to the present embodiment, the heat is hardly conducted to a portion of the outer casing by which the user grips at the time of taking video, photograph or the like, so that it is not necessary to take measures such as reducing an amount of the heat conducted to the outer casing, or improving heat radiation efficiency by increasing the outer casing in size. In other words, the improvement in the heat radiation efficiency can be achieved while ensuring the downsizing of the image-capture apparatus.

According to a second aspect of the present invention, since the heat-releasing air duct may be opened at least upward, such characteristic of air that high-temperature air moves upward can be utilized, thereby improving cooling efficiency.

According to a third aspect of the present invention, since the heat-releasing air duct may be formed so as to be opened in at least two directions and penetrate the outer casing, favorable flow property of air in the heat-releasing air duct can be ensured, thereby improving cooling efficiency.

According to a fourth aspect of the present invention, the heat-releasing air duct may be opened at least in the right-and-left direction.

According to a fifth aspect of the present invention, inside of the outer casing, a first arrangement space and a second arrangement space where the circuit board is arranged may be formed opposite to each other with the heat-releasing air duct in between. Thus, when a component likely to be affected by heat is arranged in the first arrangement space, the component likely to be affected by heat can be located in isolation from the electronic components by the heat-releasing air duct, thereby reducing the thermal effect on the components which likely to be affected by heat.

According to a sixth aspect of the present invention, since a dividing wall that partitions the inside of the outer casing into the first arrangement space and the second arrangement space may be provided inside of the outer casing, the heat transfer from the second arrangement space to the first arrangement space hardly occurs, which can suppress rise in internal temperature of the first arrangement space.

According to a seventh aspect of the present invention, a first portion located at a side of the first arrangement space and a second portion located at a side of the second arrangement space may be provided in the duct forming part of the outer casing. The imaging device may be arranged in the first arrangement space, and the first portion of the duct forming part may be formed of a material having lower thermal conductivity than that of the second portion. Therefore, the heat conducted from the electronic components to the second portion is hardly conducted to the first portion, which can suppress rise in internal temperature of the first arrangement space.

According to an eighth aspect of the present invention, a first portion located at a side of the first arrangement space side and a second portion located at a side of the second arrangement space side may be provided in the duct forming part of the outer casing, the imaging device may be arranged in the first arrangement space, and the dividing wall may be formed of a material having lower thermal conductivity than that of the second portion of the duct forming part. Therefore, the heat transfer from the second arrangement space to the first arrangement space hardly occurs, which can suppress rise in internal temperature of the first arrangement space. According to a ninth aspect of the present invention, since a disc drive that drives a disc recording medium may be arranged inside of the outer casing, the driving of the disc drive can be performed in a state where favorable heat radiation performance is ensured.

According to a tenth aspect of the present invention, since a disc drive that drives a disc recording medium may be arranged in the first arrangement space formed inside of the outer casing, the thermal effect on the disc drive, which is likely to be affected by heat, can be reduced.

According to an eleventh aspect of the present invention, since a disc drive that drives a disc recording medium may be arranged in the first arrangement space formed inside of the outer casing, the thermal effect on the disc drive, which is likely to be affected by heat, can be reduced.

According to a twelfth aspect of the present invention, a first portion located at a side of the first arrangement space side and a second portion located at a side of the second arrangement space side may be provided in the duct forming part of the outer casing, and the first portion of the duct forming part is formed of a material having lower thermal conductivity than that of the second portion. Therefore, the thermal effect on the disc drive, which is likely to be affected by heat, can be reduced.

According to a thirteenth aspect of the present invention, a first portion located at a side of the first arrangement space and a second portion located at as side of the second arrangement space may be provided in the duct forming part of the outer casing, and the dividing wall is formed of a material having lower thermal conductivity than that of the second portion of the duct forming part. Therefore, the heat transfer from the second arrangement space to the first arrangement space hardly occurs, which can suppress rise in internal temperature of the first arrangement space.

DETAILED DESCRIPTION OF EMBODIMENTS

Hereinafter, embodiments for carrying out the present invention is described with reference to the appended drawings.

In the embodiment described below, the present invention directed to an image-capture apparatus is applied to a video camera. The application range of the present invention is not limited to the video camera, but for example, can be widely applied to a still camera and another image-capture apparatus for taking video or photographing an image.

In the following description, directions of front and rear, up and down, right and left correspond to those viewed from a photographer (user) at the time of taking video or photograph with the video camera. Accordingly, it is set that the subject side is the front, and the photographer side is the back. The directions of front and rear, up and down, right and left described below are only intended for convenience in description, and thus, the present invention is not limited by these directions when carrying out.

In an image-capture apparatus (video camera) 1, predetermined parts are arranged inside of an outer casing 2.

Figure 1:
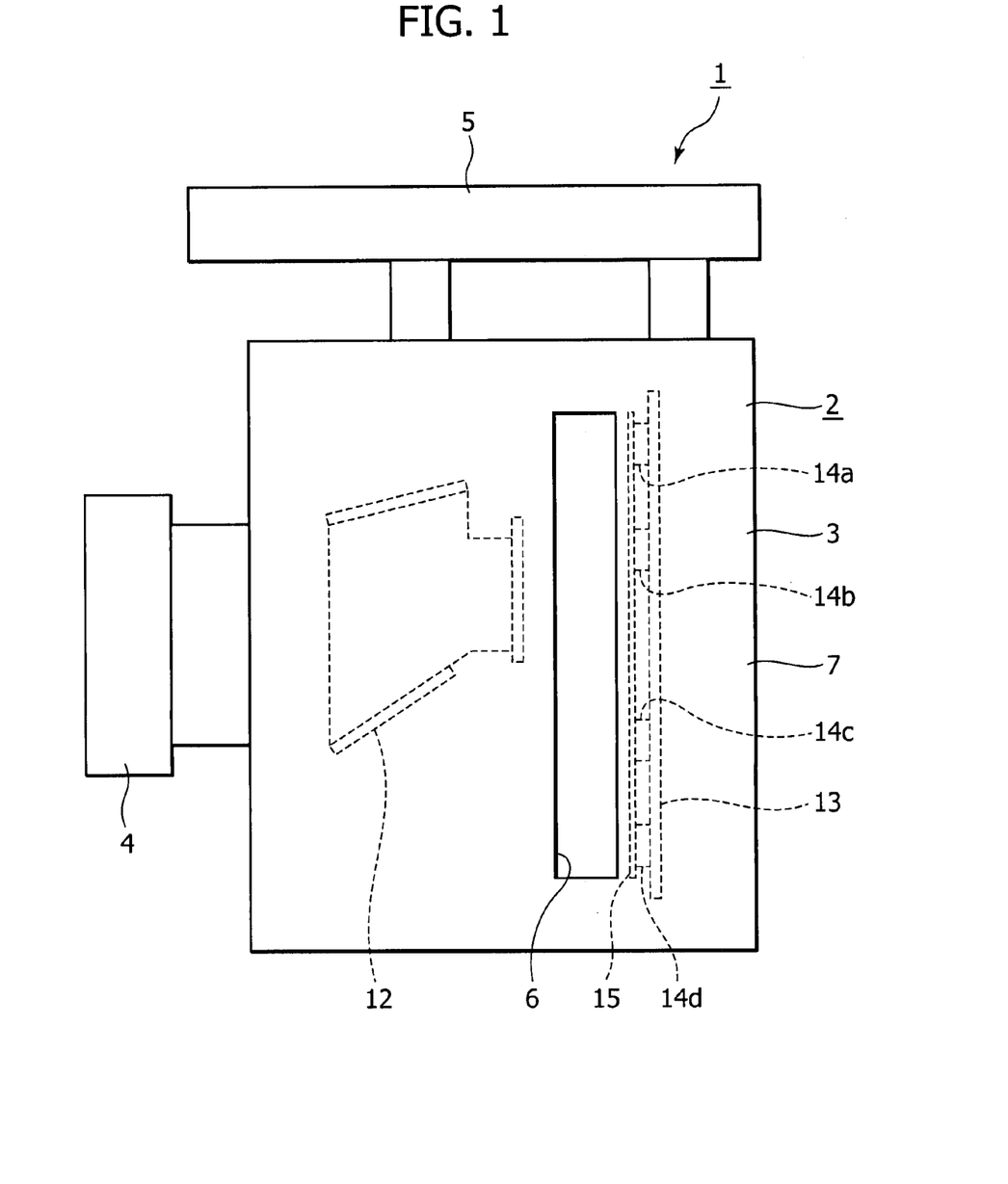
FIG. 1 is a schematic side view of an image-capture apparatus, showing an embodiment of the present invention together with FIGS. 2 and 10.

The image-capture apparatus 1, for example, as shown in FIG. 1, includes a body part 3, a lens barrel part 4 provided at a front end of the body part 3, and a grip part 5 provided above the body part 3. Inside of the lens barrel part 4, various lenses such as a zoom lens and a focus lens not shown in the figure are arranged, and at a rear end of the grip part 5, a finder not shown in the figure is provided.

Figure 2:
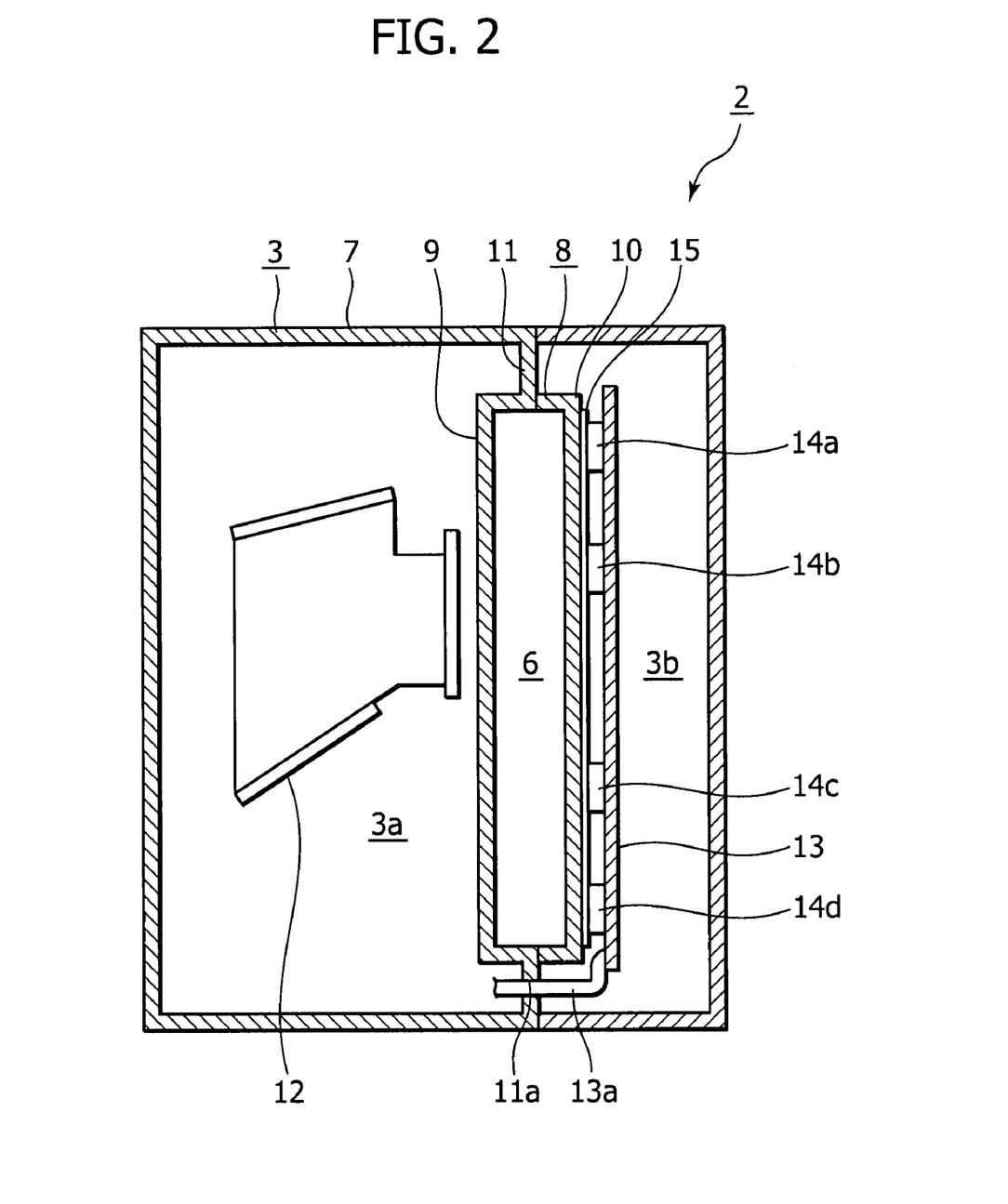
FIG. 2 is a schematic cross-sectional view showing an internal construction.

In the body part 3, a heat-releasing air duct 6 penetrating in the right-and-left direction is formed (refer to FIGS. 1 and 2). The body part 3 is made of an outer surface part 7 formed into a box form and a duct forming part 8 located inside of the outer surface part 7, and the heat-releasing air duct 6 is formed by being surrounded by the duct forming part 8. In the duct forming part 8, a first portion 9 formed into a depression form and opened to the rear, and a second portion 10 formed into a depression form and opened to the front are joined in the front-and-rear direction.

The first portion 9 is formed of a material having lower thermal conductivity than that of the second portion 10. The first portion 9 is formed of a resin material such as ABS (acrylonitrile butadiene styrene copolymer) and PC (polycarbonate resin), for example, and the second portion 10 is formed of a metal material such as magnesium, aluminum, and copper, for example.

Inside of the body part 3, a dividing wall 11 that partitions an internal space of the body part 3 in the front-and-rear direction. The dividing wall 11 is annularly formed of a material having lower thermal conductivity than that of the second portion 10 of the duct forming part 8, for example, the same resin material as that of the first portion 9, and an outer peripheral surface thereof is continued to an inner surface of the outer surface part 7, and an inner peripheral surface thereof is continued to a rear end of the first portion 9 of the duct forming part 8. The dividing wall 11 is formed with an insertion hole 11a.

Inside of the body part 3 are formed two spaces obtained by partitioning the inside of the body part 3 in the front-and-rear direction by the duct forming part 8 and the dividing wall 11, and these two spaces are a first arrangement space 3a, and a second arrangement space 3b, respectively.

In the first arrangement space 3a, an imaging device 12 that converts an image of a subject into a video signal is arranged.

A circuit board 13 is arranged in the second arrangement space 3b. The circuit board 13 is a circuit that performs various types of control over predetermined parts provided in the image-capture apparatus 1. For example, controls over image processing of the imaging device 12 and the like are performed. The circuit board 13 is arranged so as to be oriented in the front-and-rear direction, on a front surface of which a plurality of electronic components 14a, 14b, . . . , which will be heat generating elements, are mounted.

One end of a connection line 13a is connected to the circuit board 13, and the connection line 13a is inserted into the insertion hole 11a of the dividing wall 11, while the other end is connected to the imaging device 12.

A heat transfer sheet 15 is arranged between the electronic components 14a, 14b, . . . mounted on the circuit board 13 and the second portion 10 of the duct forming part 8. One surface (front surface) of the heat transfer sheet 15 makes contact with the second portion 10 and the other surface (rear surface) makes contact with the electronic components 14a, 14b, . . . .

In the image-capture apparatus 1 constituted as described above, when the respective parts are operated at the time of taking video, photographing or the like, the electronic components 14a, 14b, . . . mounted on the circuit board 13 generate heat, and this generated heat is conducted through the heat transfer sheet 15 to the second portion 10 of the duct forming part 8, which is formed of the metal material or the like, and is released outside of the outer casing 2 from the heat-releasing air duct 6.

In the present embodiment, as described above, since the duct forming part 8 is formed in such a manner that the first portion 9 located on the first arrangement space 3a side is formed of the material having lower thermal conductivity than that of the second portion 10 located on the second arrangement space 3b side, the heat conducted from the electronic components 14a, 14b, . . . to the second portion 10 is hardly conducted to the first portion 9.

Moreover, since the inside of the body part 3 is partitioned into the first arrangement space 3a and the second arrangement space 3b by the duct forming part 8 and the dividing wall 11 formed of the material having low thermal conductivity, the transfer of the heat from the second arrangement space 3b to the first arrangement space 3a hardly occurs.

As described above, in the image-capture apparatus 1, since the heat-releasing air duct 6 opened to the outer surface part 7 of the outer casing 2 is formed on the outer surface side of the outer casing 2 to release the heat outside of the outer casing 2 from the heat-releasing air duct 6, the heat is hardly conducted to the outer surface part 7, which is gripped by the user at the time of taking video, photographing or the like.

Accordingly, it is not necessary to take measures such as reduction in an amount of heat conducted to the outer casing 2, or improvement in heat radiation efficiency by increasing the outer casing 2 in size, and thus, the improvement in heat radiation efficiency can be achieved while ensuring the downsizing of the image-capture apparatus 1.

Moreover, since the heat-releasing air duct 6 is not communicated with the inside of the outer casing 2, dust and the like can be prevented from entering the inside of the outer casing 2, which can enhance the reliability in the operation of the respective parts arranged inside of the outer casing 2.

Moreover, since in the duct forming part 8 forming the heat-releasing air duct 6, the first portion 9 is formed of the material having lower thermal conductivity than that of the second portion 10, the heat conducted from the electronic components 14a, 14b, . . . to the second portion 10 is hardly conducted to the first portion 9, so that rise in internal temperature of the first arrangement space 3a can be suppressed, thereby ensuring the reliability in operation of the imaging device 12.

Furthermore, in the image-capture apparatus 1, since the heat-releasing air duct 6 is formed so as to be opened in two directions and penetrate the outer casing 2, favorable flow property of air in the heat-releasing air duct 6 can be assured, which brings about improvement in cooling efficiency. Moreover, even during taking video or photographing outdoors, no rain will be collected.

Still further, since the openings of the heat-releasing air duct 6 are located in the right-and-left direction, the joining of the grip part 5 is not disturbed.

Additionally, since inside of the outer casing 2, the first arrangement space 3a and the second arrangement space 3b where the circuit board 13 is arranged are formed opposite to each other with the heat-releasing air duct 6 interposed, the imaging device 12 arranged in the first arrangement space 3a can be located in isolation from the electronic components 14a, 14b, . . . by the heat-releasing air duct 6, which can reduce a thermal effect on the imaging device 12.

Moreover, since the inside of the outer casing 2 is partitioned into the first arrangement space 3a and the second arrangement space 3b by the dividing wall 11, the heat transfer from the second arrangement space 3b to the first arrangement space 3a hardly occurs, which can suppress rise in internal temperature of the first arrangement space 3a.

Since the isolating wall 11 is formed of the material having lower thermal conductivity than that of the second portion 10 of the duct forming part 8, the heat transfer from the second arrangement space 3b to the first arrangement space 3a hardly occurs, which can further suppress rise in internal temperature of the first arrangement space 3a.

Figure 3:
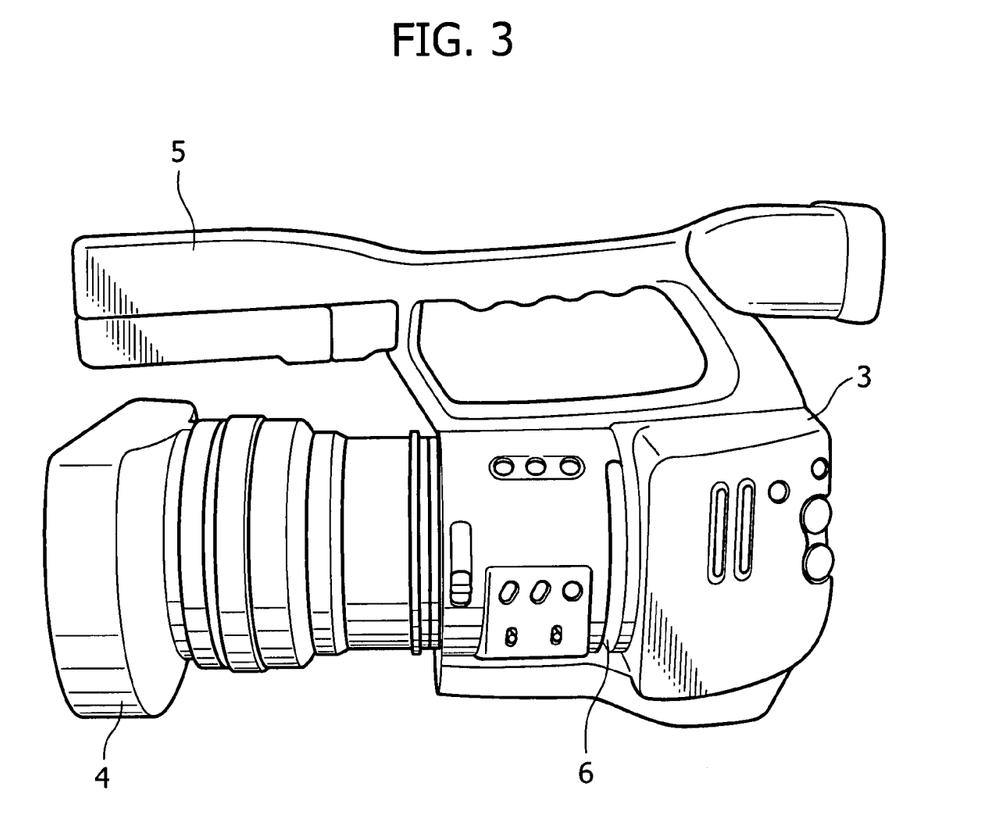
FIG. 3 is a schematic perspective view of an appearance of image-capture apparatus.

A schematic perspective view of the appearance of the image-capture apparatus is shown in FIG. 3. The openings of the heat-releasing air duct 6 are opened along a circumference of a cylindrical portion of the body part 3. The openings are disposed in the circular cylindrical portion at the vicinity of peripheral region of a rectangular parallelepiped portion. This allows the photographer to easily recognize the position of the openings by touching even in a typical photographing position, in which the photographer takes a video or photograph while viewing through a viewfinder, thereby preventing the photographer from closing the opening with his or her hand by mistake.

Figure 4:
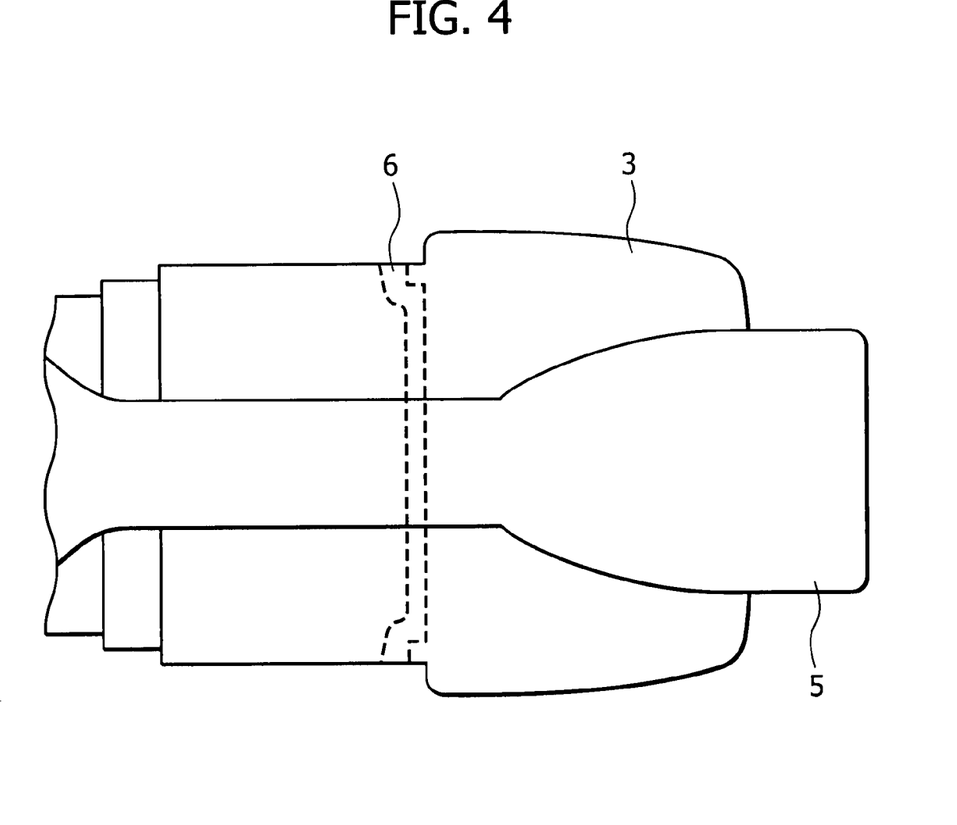
FIG. 4 is a schematic view showing a shape of a heat-releasing air duct in a upper external view of an image-capture apparatus.

Moreover, the heat-releasing air duct 6 is formed into a crank shape in the right-and-left direction of the image-capture apparatus. This aspect is schematically shown by a dashed line in FIG. 4. By forming the heat-releasing air duct 6 into the crank shape instead of forming the same in straight line form. Accordingly, the duct does not look penetrating from the appearance, and the photographer would not feel difference in comparison with a related art image-capture apparatus.

While in the foregoing, there is described the case where the heat-releasing air duct 6 penetrating the outer casing 2 in the right-and-left direction is formed in the outer casing 2, the heat-releasing air duct is not limited to the penetrating shape as long as one or more openings are formed in at least one surface of the outer casing 2. For example, it may be formed into a depression form and opened to one side. Alternatively, the heat-releasing air duct can be formed into a penetrating shape with openings at three or more surfaces of the outer casing 2.

Hereinafter, modification examples of the image-capture apparatus 1 are described (refer to FIGS. 5 to 10).

In the descriptions of the respective modification examples shown below, only different parts from those of the above-described image-capture apparatus 1 are described in detail, and the other parts are given the same reference numerals and signs as those given to similar parts in the image-capture apparatus 1, descriptions of which are omitted.

Figure 5:
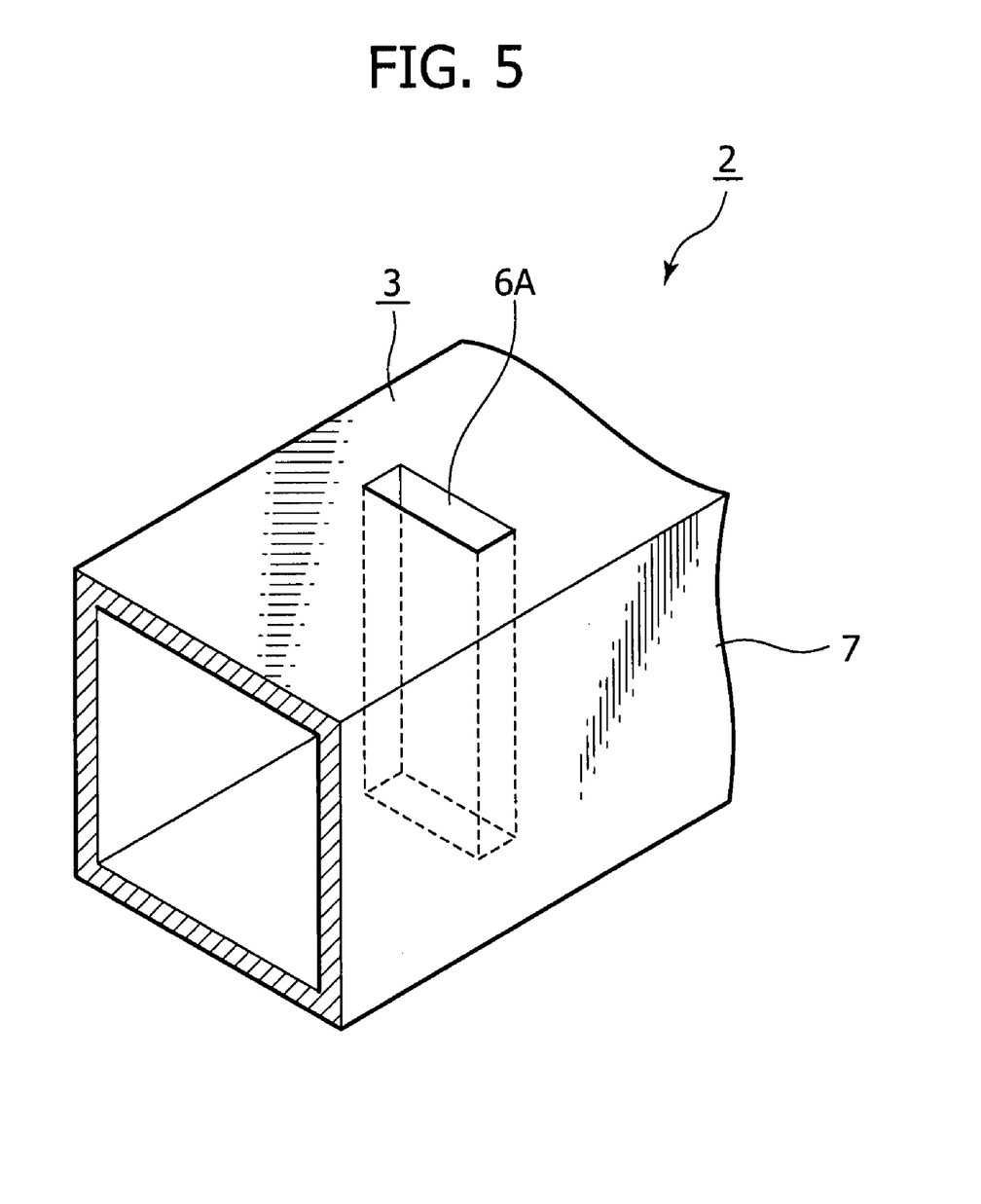
FIG. 5 is a schematic perspective view showing a first modification example.

In a first modification example, as shown in FIG. 5, a heat-releasing air duct 6A is formed into a shape penetrating in the up-and-down direction. By having the heat-releasing air duct 6A penetrating in the up-and-down direction, the characteristic of air that high-temperature air moves upward can be utilized, which can improve the cooling efficiency.

Figure 6:
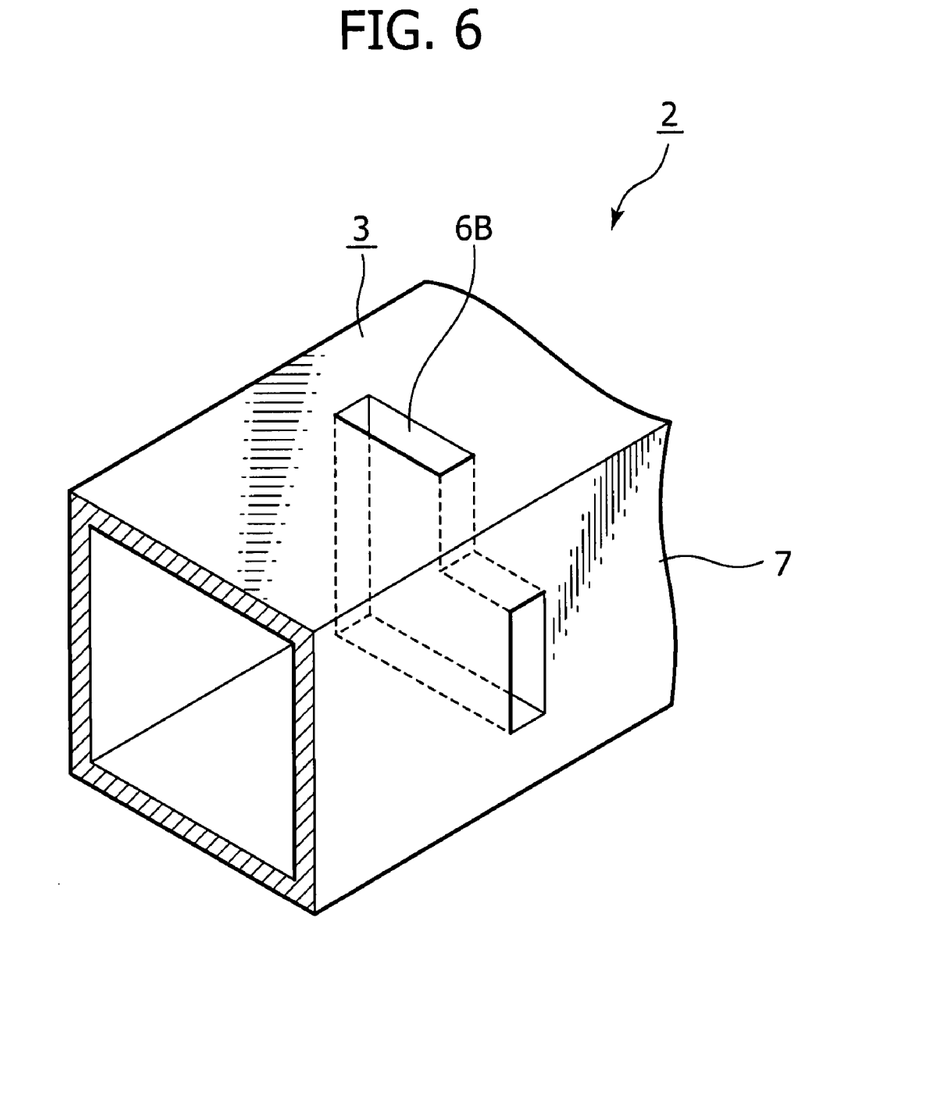
FIG. 6 is a schematic perspective view showing a second modification example.

In a second modification example, as shown in FIG. 6, a heat-releasing air duct 6B is formed into a shape penetrating laterally and upward, and bent so as to form an L shape. By having the heat-releasing air duct 6B penetrating and opened upward, the characteristic of air that high-temperature air moves upward can be utilized, which can improve the cooling efficiency.

Moreover, forming the heat-releasing air duct 6B into the bent shape can increase the freedom degree in design.

Figure 7:
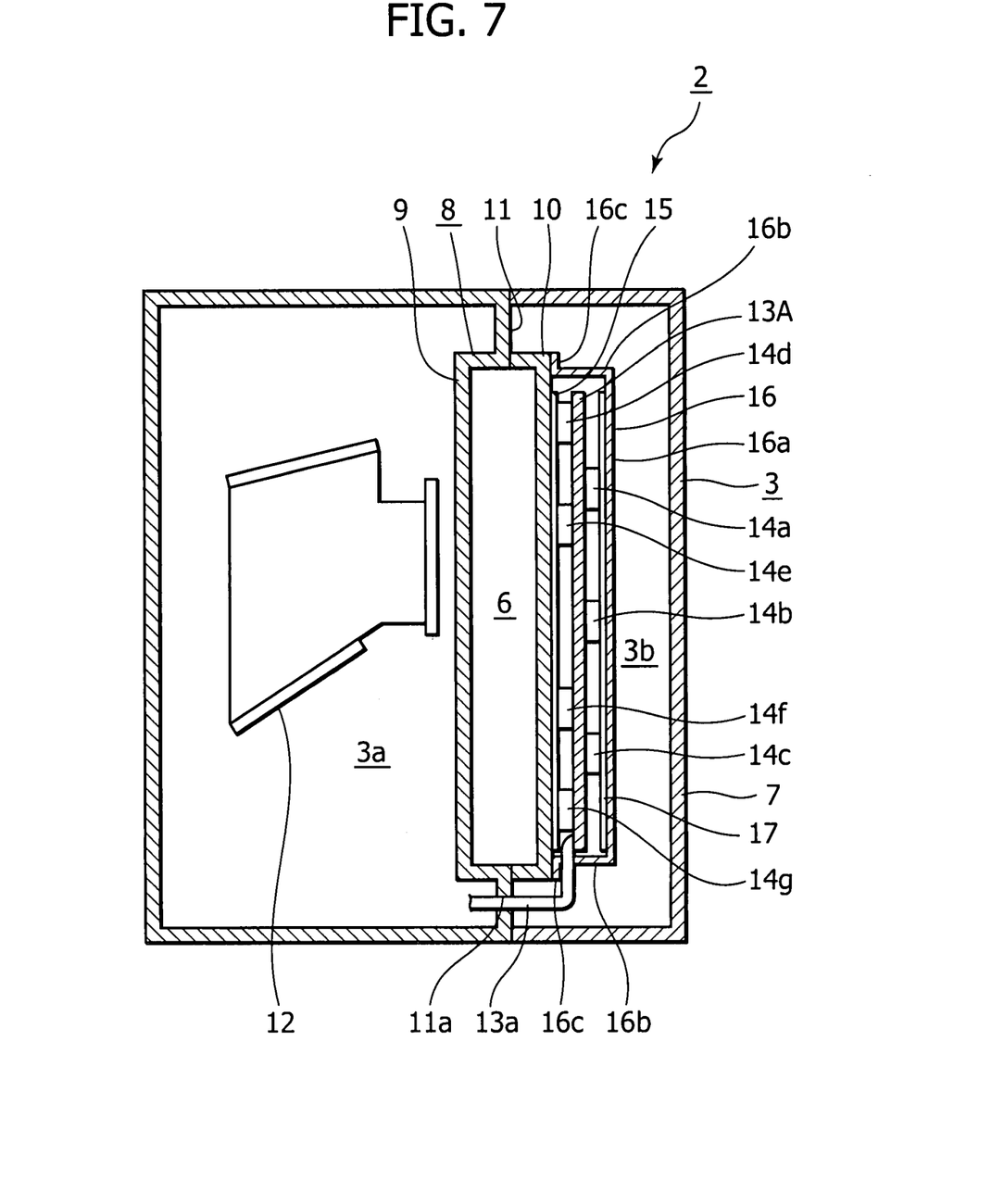
FIG. 7 is a schematic cross-sectional view showing a third modification example.

In a third modification example, as shown in FIG. 7, the electronic components 14a, 14b, . . . are mounted on both surfaces of a circuit board 13A.

In the second arrangement space 3b, a thermal conductive member 16 formed of a material having high thermal conductivity, such as a metal material, is arranged. The thermal conductive member 16 is made of a contact surface portion 16a oriented in the front-and-rear direction, joining portions 16b, 16b projected forward from upper and lower ends of the contact surface portion 16a respectively, and attached portions 16c, 16c provided at front ends of the joining portions 16b, 16b. In the thermal conductive member 16, the contact surface portion 16a makes contact with the electronic components 14a, 14b, . . . mounted on a rear surface of the circuit board 13A through a heat transfer sheet 17, and the attached portions 16c, 16c are attached to both upper and lower ends of the second portion 10 of the duct forming part 8.

In the third modification example, when the respective parts are operated at the time of taking video, photographing or the like, the electronic components 14a, 14b, . . . mounted on the circuit board 13A generate heat, and this generated heat is conducted to the second portion 10 through the heat transfer sheet 15, and at the same time, is conducted to the second portion 10 through the heat transfer sheet 17 and the thermal conductive member 16 so as to be released outside of the outer casing 2 from the heat-releasing air duct 6.

Thus, in the case where the electronic components 14a, 14b, . . . are mounted on both the surfaces of the circuit board 13A, the heat is also released outside of the outer casing 2 from the heat-releasing air duct 6, which can improve the heat radiation efficiency while ensuring the downsizing of the image-capture apparatus 1.

Figure 8:
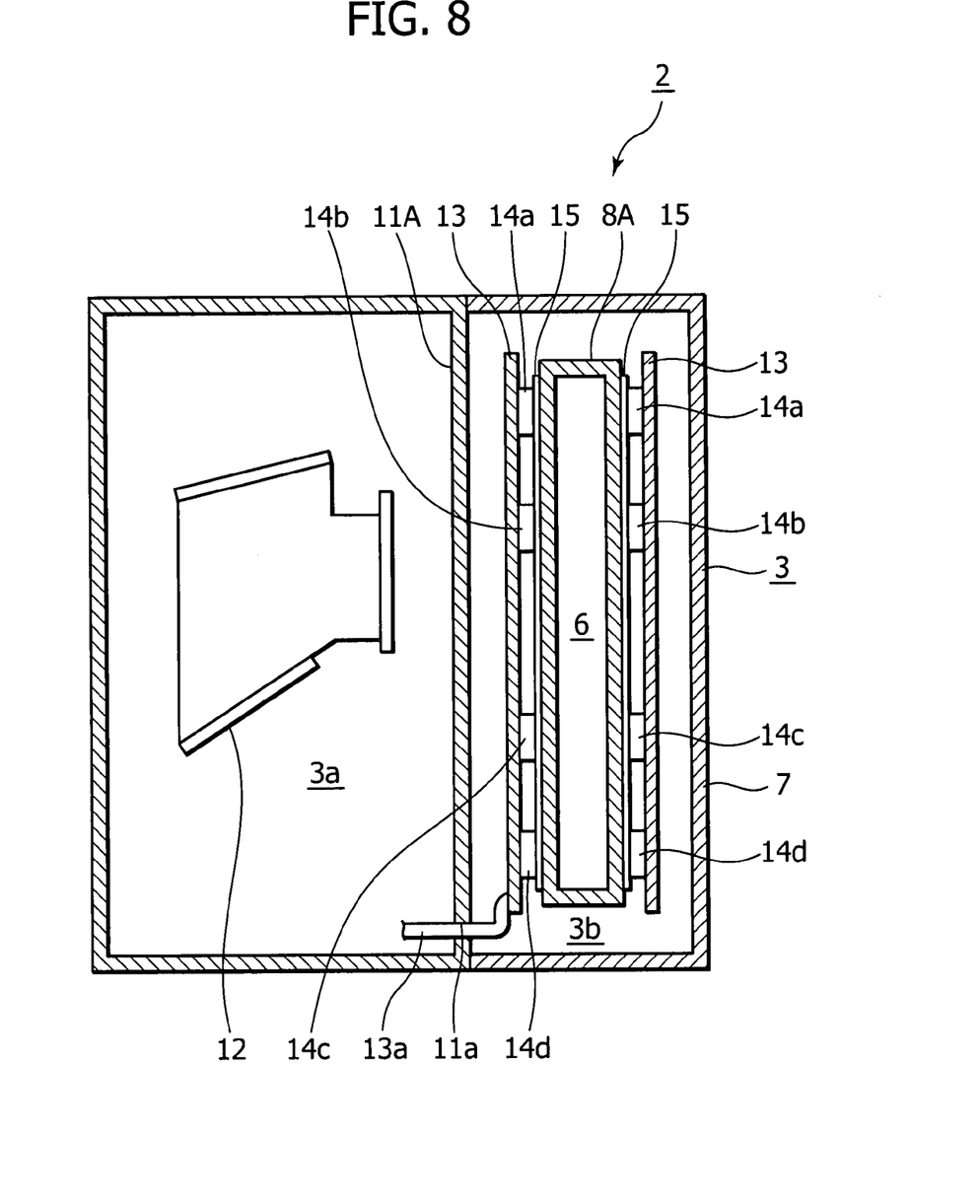
FIG. 8 is a schematic cross-sectional view showing a fourth modification example.

In a fourth modification example, as shown in FIG. 8, the inside of the body part 3 is partitioned by the dividing wall 11A into the first arrangement space 3a and the second arrangement space 3b, and in the second arrangement space 3b, a duct forming part 8A is provided.

Two circuit boards 13, 13 are arranged in the second arrangement space 3b. On a rear surface of one of the circuit boards 13, the electronic components 14a, 14b, . . . are mounted, while on a front surface of the other circuit board 13, the electronic components 14a, 14b, . . . are mounted.

The entire duct forming part 8A is formed of a metal material having high thermal conductivity or the like.

The electronic components 14a, 14b, . . . mounted on the circuit boards 13, 13 make contact with the duct forming part 8A through the heat transfer sheets 15, 15, respectively.

When the respective parts are operated at the time of taking video, photographing or the like, the electronic components 14a, 14b, . . . mounted on the circuit boards 13, 13 generate heat, and this generated heat is conducted through the heat transfer sheets 15, 15 to the duct forming part 8A, and is released outside of the outer casing 2 from the heat-releasing air duct 6.

Thus, in the case where the two circuit boards 13, 13 are provided, the heat is also released outside of the outer casing 2 from the heat-releasing air duct 6, which can improve the heat radiation efficiency while ensuring the downsizing of the image-capture apparatus 1.

Figure 9:
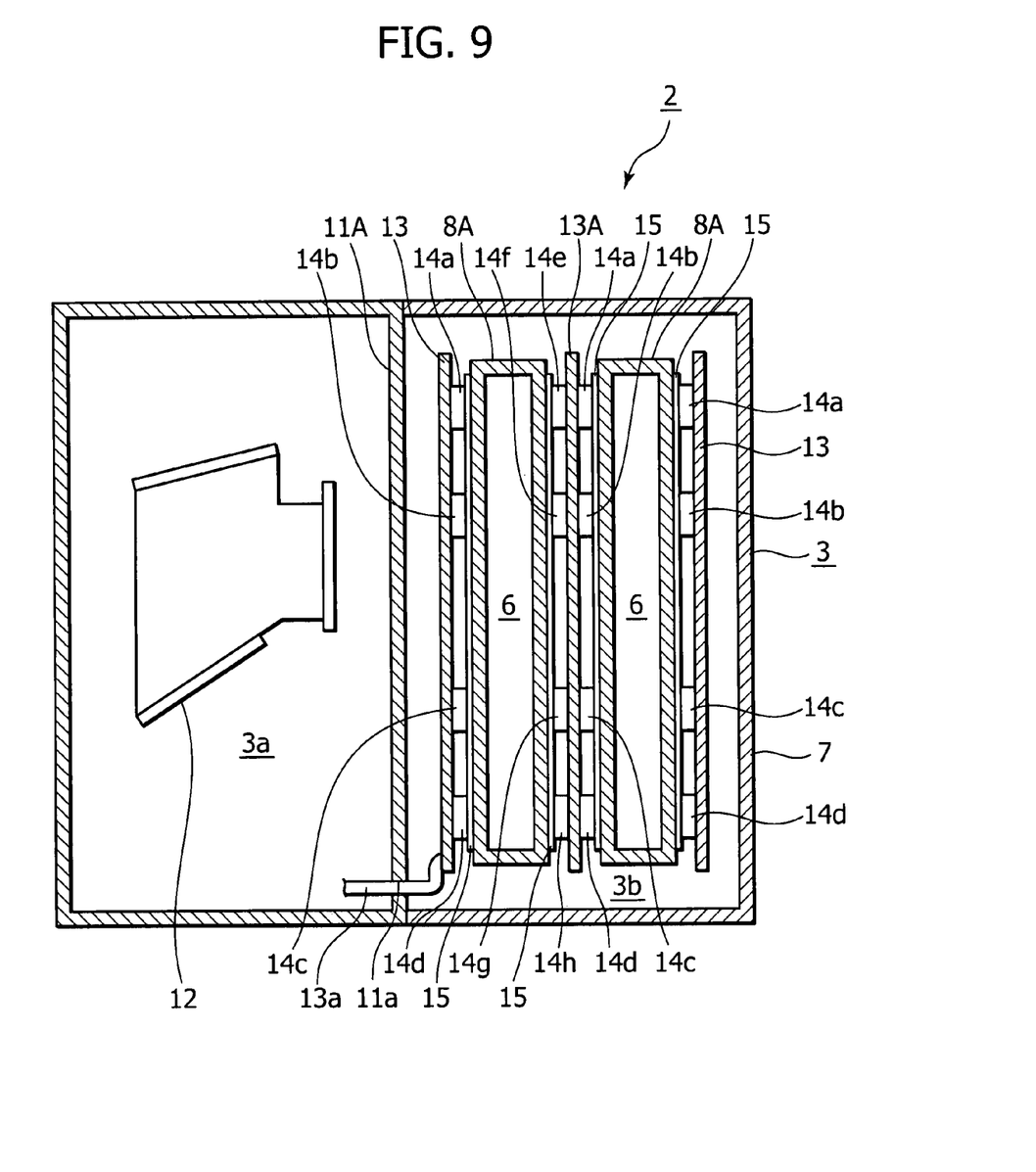
FIG. 9 is a schematic cross-sectional view showing a fifth modification example.

In a fifth modification example, as shown in FIG. 9, the inside of the body part 3 is partitioned by the dividing wall 11A into the first arrangement space 3a and the second arrangement space 3b, and the two duct forming parts 8A, 8A are provided in the second arrangement space 3b.

In the second arrangement space 3b, the three circuit boards 13, 13A, 13 are arranged. On a rear surface of the circuit board 13 located on the front side, the electronic components 14a, 14b, . . . are mounted, on both front and rear surfaces of the circuit board 13A located in the center, the electronic components 14a, 14b, . . . are mounted, respectively, and on a front surface of the circuit board 13 located on the rear side, the electronic components 14a, 14b, . . . are mounted.

The entire duct forming parts 8A, 8A are each formed of a metal material having high thermal conductivity or the like.

The electronic components 14a, 14b, . . . mounted on the circuit boards 13, 13A, 13 make contact with the duct forming parts 8A, 8A through the heat transfer sheets 15, 15, . . . respectively.

When the respective parts are operated at the time of taking video, photographing or the like, the electronic components 14a, 14b, . . . mounted on the circuit boards 13, 13A, 13 generate heat, and this generated heat is conducted to the duct forming parts 8A, 8A through the heat transfer sheets 15, 15, . . . , and is released outside of the outer casing 2 from the heat-releasing air ducts 6, 6.

Thus, in the case where the three circuit boards 13, 13A, 13 are provided, the heat is also released outside of the outer casing 2 from the heat-releasing air ducts 6, 6, which can improve the heat radiation efficiency while ensuring the downsizing of the image-capture apparatus 1.

While in the fifth modification example, the case where the two duct forming parts 8A, 8A and the three circuit boards 13, 13A, 13 are arranged is described as an example, the numbers of the duct forming parts and the circuit boards are not limited to these, but the number of the duct forming parts can be determined in accordance with the number of arranged circuit boards to release the heat generated in the electronic components.

Figure 10:
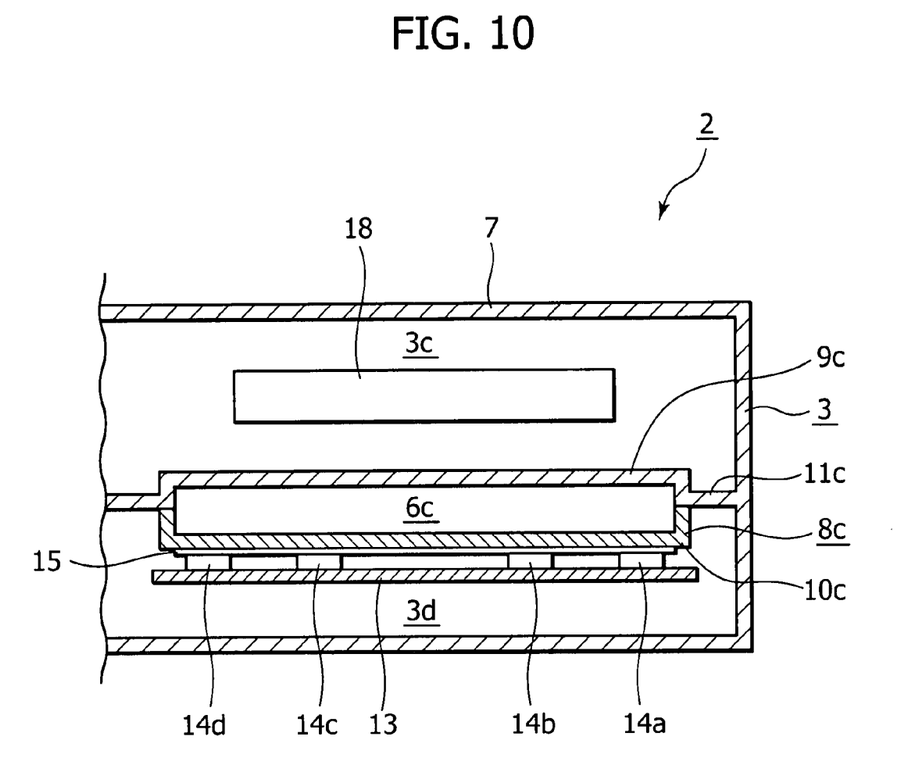
FIG. 10 is a schematic cross-sectional view showing a sixth modification example.

In a sixth modification example, as shown in FIG. 10, for example, a heat-releasing air duct 6C penetrating the body part 3 in the up-and-down direction and having a cross-sectional shape longer than is wide. A duct forming part 8C forming the heat-releasing air duct 6C is provided with a right half portion as a first portion 9C formed of a resin material having lower thermal conductivity or the like and with left half portion as a second portion 10C formed of a metal material having higher thermal conductivity or the like.

Inside of the body part 3, a part to the right side of the heat-releasing air duct 6C is formed as a first arrangement space 3c and a part to the left side of the heat-releasing air duct 6C is formed as a second arrangement space 3d. The inside of the outer casing 2 is partitioned into the first arrangement space 3c and the second arrangement space 3d by a dividing wall 11C formed of a resin material having low thermal conductivity or the like.

In the first arrangement space 3c, a disc drive 18 that drives a disc recording medium is arranged, and in the second arrangement space 3d, the circuit board 13 is arranged. The electronic components 14a, 14b, . . . mounted on the circuit board 13 make contact with the second portion 10C of the duct forming part 8C through the heat transfer sheet 15.

When the respective parts are operated at the time of taking video, photographing or the like, the electronic components 14a, 14b, . . . mounted on the circuit board 13 generate heat, and this generated heat is conducted to the duct forming part 8C through the heat transfer sheet 15, and is released outside of the outer casing 2 from the heat-releasing air duct 6C.

Typically, the disc drive 18 is likely to be affected by the heat, and thus, the above-described arrangement of the circuit board 13, the duct forming part 8C and the disc drive 18 allows the heat to be released outside of the outer casing 2 from the heat-releasing air duct 6C, which can improve the heat radiation efficiency while ensuring the downsizing of the image-capture apparatus 1, and can reduce the thermal effect on the disc drive 18.

Moreover, since the inside of the outer casing 2 is partitioned into the first arrangement space 3c and the second arrangement space 3d by the dividing wall 11C formed of a material having low thermal conductivity, the heat transfer from the second arrangement space 3d to the first arrangement space 3c hardly occurs, which can suppress the rise in internal temperature of the first arrangement space 3c.

The specific shapes and structures of the respective parts shown in the above-described embodiment are only examples of embodiment when the present invention is carried out, and the technical range of the present invention should not be construed in a limited way by these.

The present document contains subject matter related to Japanese Patent Application No. 2006-277842 filed in the Japanese Patent Office on Oct. 11, 2006, the entire content of which being incorporated herein by reference.

What is claimed is:

1. An image-capture apparatus comprising:
   an outer casing inside of which predetermined parts are arranged;
   an imaging device arranged inside of the outer casing; and
   a circuit board arranged inside of the outer casing, on which electronic components are mounted, the electronic components being heat generating elements,
   wherein a heat-releasing air duct is formed on an outer surface side of the outer casing, at least an opening of the duct being formed at one surface of the outer casing and not communicating with an inside of the outer casing, the heat-releasing air duct being disposed between the imaging device and the circuit board;
   part of the outer casing is provided as a duct forming part that forms the heat-releasing air duct; and
   heat generated by the electronic components mounted on the circuit board is conducted to the duct forming part to be released outside of the outer casing from the heat-releasing air duct.

2. The image-capture apparatus according to claim 1, wherein
   the heat-releasing duct is opened with at least-one opening at a top side of the outer casing.

3. The image-capture apparatus according to claim 1, wherein
   the heat-releasing air duct is formed so as to be opened in at least two directions and penetrate the outer casing.

4. The image-capture apparatus according to claim 3, wherein
   the heat-releasing air duct is opened at least connecting two sides of the outer casing.

5. The image-capture apparatus according to claim 1, wherein
   inside of the outer casing, a first arrangement space and a second arrangement space where the circuit board is arranged are formed opposite to each with the heat-releasing air duct in between.

6. The image-capture apparatus according to claim 5, wherein
   a dividing wall that partitions the inside of the outer casing into the first arrangement space and the second arrangement space is provided inside of the outer casing.

7. An image-capture apparatus comprising:
   an outer casing inside of which predetermined parts are arranged;
   an imaging device arranged inside of the outer casing; and
   a circuit board arranged inside of the outer casing, on which electronic components are mounted, the electronic components being heat generating elements,
   wherein a heat-releasing air duct is formed on an outer surface side of the outer casing, at least an opening of the duct being formed at one surface of the outer casing and not communicating with an inside of the outer casing;
   part of the outer casing is provided as a duct forming part that forms the heat-releasing air duct; and
   heat generated by the electronic components mounted on the circuit board is conducted to the duct forming part to be released outside of the outer casing from the heat-releasing air duct,
   wherein inside of the outer casing, a first arrangement space and a second arrangement space where the circuit board is arranged are formed opposite to each other with the heat-releasing air duct in between, and
   wherein:
   a first portion located at a side of the first arrangement space and a second portion located at a side of the second arrangement space are provided in the duct forming part of the outer casing;
   the imaging device is arranged in the first arrangement space; and
   the first portion of the duct forming part is formed of a material having lower thermal conductivity than that of the second portion.

8. An image-capture apparatus comprising:
   an outer casing inside of which predetermined parts are arranged;
   an imaging device arranged inside of the outer casing; and
   a circuit board arranged inside of the outer casing, on which electronic components are mounted, the electronic components being heat generating elements,
   wherein a heat-releasing air duct is formed on an outer surface side of the outer casing, at least an opening of the duct being formed at one surface of the outer casing and not communicating with an inside of the outer casing;
   part of the outer casing is provided as a duct forming part that forms the heat-releasing air duct; and
   heat generated by the electronic components mounted on the circuit board is conducted to the duct forming part to be released outside of the outer casing from the heat-releasing air duct,
   wherein inside of the outer casing, a first arrangement space and a second arrangement space where the circuit board is arranged are formed opposite to each other with the heat-releasing air duct in between, wherein a dividing wall that partitions the inside of the outer casing into the first arrangement space and the second arrangement space is provided inside of the outer casing, and wherein:
- a first portion located at a side of the first arrangement space and a second portion located at a side of the second arrangement space are provided in the duct forming part of the outer casing;
- the imaging device is arranged in the first arrangement space; and
- the dividing wall is formed of a material having lower thermal conductivity than that of the second portion of the duct forming part.

9. An image-capture apparatus comprising:

an outer casing inside of which predetermined parts are arranged;

an imaging device arranged inside of the outer casing; and a circuit board arranged inside of the outer casing, on which electronic components are mounted, the electronic components being heat generating elements, wherein a heat-releasing air duct is formed on an outer surface side of the outer casing, at least an opening of the duct being formed at one surface of the outer casing and not communicating with an inside of the outer casing;

part of the outer casing is provided as a duct forming part that forms the heat-releasing air duct; and heat generated by the electronic components mounted on the circuit board is conducted to the duct forming part to be released outside of the outer casing from the heat-releasing air duct, wherein a disc drive that drives a disc recording medium is arranged inside of the outer casing.

10. An image-capture apparatus comprising:

an outer casing inside of which predetermined parts are arranged;

an imaging device arranged inside of the outer casing; and a circuit board arranged inside of the outer casing, on which electronic components are mounted, the electronic components being heat generating elements, wherein a heat-releasing air duct is formed on an outer surface side of the outer casing, at least an opening of the duct being formed at one surface of the outer casing and not communicating with an inside of the outer casing;

part of the outer casing is provided as a duct forming part that forms the heat-releasing air duct; and heat generated by the electronic components mounted on the circuit board is conducted to the duct forming part to be released outside of the outer casing from the heat-releasing air duct, wherein inside of the outer casing, a first arrangement space and a second arrangement space where the circuit board is arranged are formed opposite to each other with the heat-releasing air duct in between, and wherein a disc drive that drives a disc recording medium is arranged in the first arrangement space formed inside of the outer casing.

11. The image-capture apparatus according to claim 10, wherein:
- a first portion located at a side of the first arrangement space and a second portion located at a side of the second arrangement space are provided in the duct forming part of the outer casing; and
- the first portion of the duct forming part is formed of a material having lower thermal conductivity than that of the second portion of the duct forming part.

12. An image-capture apparatus comprising:

an outer casing inside of which predetermined parts are arranged;

an imaging device arranged inside of the outer casing; and a circuit board arranged inside of the outer casing, on which electronic components are mounted, the electronic components being heat generating elements, wherein a heat-releasing air duct is formed on an outer surface side of the outer casing, at least an opening of the duct being formed at one surface of the outer casing and not communicating with an inside of the outer casing;

part of the outer casing is provided as a duct forming part that forms the heat-releasing air duct; and heat generated by the electronic components mounted on the circuit board is conducted to the duct forming part to be released outside of the outer casing from the heat-releasing air duct, wherein inside of the outer casing, a first arrangement space and a second arrangement space where the circuit board is arranged are formed opposite to each other with the heat-releasing air duct in between, wherein a dividing wall that partitions the inside of the outer casing into the first arrangement space and the second arrangement space is provided inside of the outer casing, and wherein a disc drive that drives a disc recording medium is arranged in the first arrangement space formed inside of the outer casing.

13. The image-capture apparatus according to claim 12, wherein:
- a first portion located at a side of the first arrangement space and a second portion located at a side of the second arrangement space are provided in the duct forming part of the outer casing; and
- the dividing wall is formed of a material having lower thermal conductivity than that of the second portion of the duct forming part.

* * * * *